United States Patent [19]

Murphy

[11] 4,139,109
[45] Feb. 13, 1979

[54] LOAD LIFT ASSEMBLY FOR TRUCKS

[76] Inventor: Robert P. Murphy, 1809 Commercial St., St. Joseph, Mo. 64503

[21] Appl. No.: 820,224

[22] Filed: Jul. 29, 1977

[51] Int. Cl.² .................................................. B60P 1/46
[52] U.S. Cl. ................................. 214/75 R; 187/9 R; 214/750
[58] Field of Search .......... 187/9 R; 214/75 R, 75 T, 214/750, 730, 731

[56] References Cited

U.S. PATENT DOCUMENTS

| | | | |
|---|---|---|---|
| 3,104,910 | 9/1963 | Rappen | 214/75 T |
| 3,142,396 | 7/1964 | Pauley et al. | 214/75 T |
| 3,734,239 | 5/1973 | Martin et al. | 214/75 T |

Primary Examiner—L. J. Paperner
Assistant Examiner—R. B. Johnson

[57] ABSTRACT

A rear end lift assembly for ready attachment at the interior sides of the rear access opening of a truck body, as a low-load semi-trailer, and thus protected from weather and dirt, and presenting vertical trackways each receiving sliding shoes carrying inwardly extending arms projecting through trackway openings, each arm adapted to removably receive a lift fork with a rearwardly extending article support arm leaving an open space between the arms for operator access in shifting articles from the lift fork arrangement to vertical spaced shelving along the sides of the truck body at any level to which the lift fork arrangement may be selectively powered.

6 Claims, 4 Drawing Figures

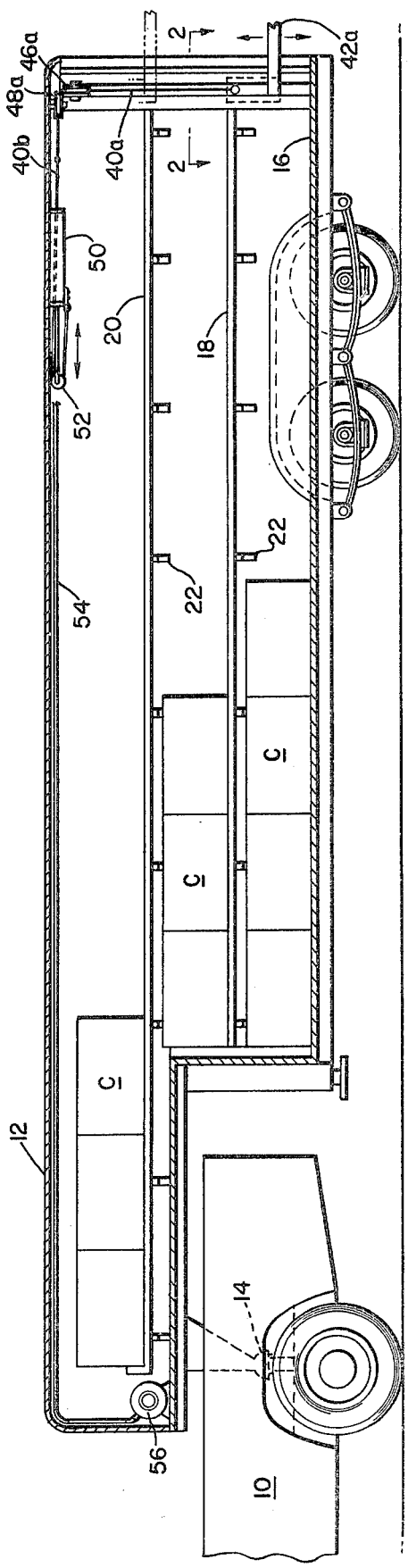
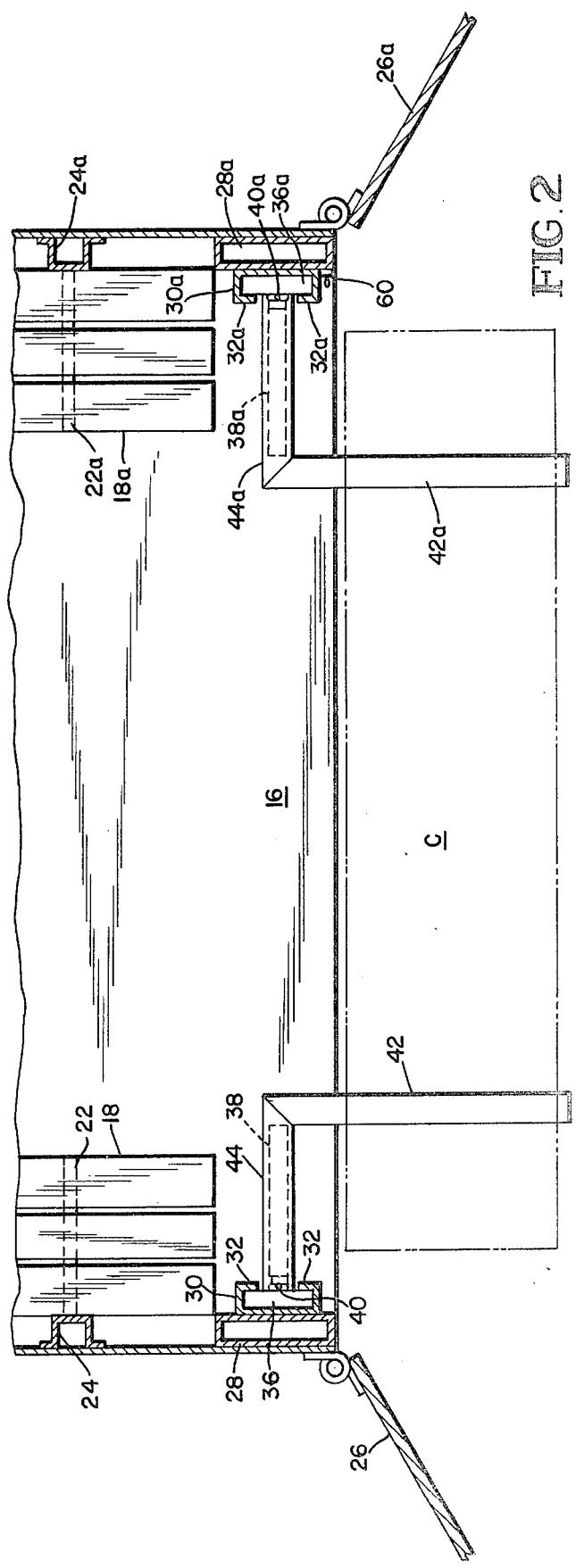

LOAD LIFT ASSEMBLY FOR TRUCKS

BACKGROUND OF THE INVENTION

This invention is concerned with a lift assembly for ready attachment inside the rear access opening of a semi-trailer. The prior art includes many forms of such lift assemblies for van trucks, such as a lift similar to a warehouse lift truck or a tail gate assembly for movement between ground level and the truck bed. The prior art has also provided lift assemblies, normally in the form of platforms, which may be moved from a lowermost position to various levels relative to shelving within the truck body for receiving articles to be transported on the shelving. Particularly in the casket industry, the transport of empty caskets to destination has normlly been in van trucks requiring time-consuming manual loading whether or not the truck may include spaced support shelving.

SUMMARY OF THE INVENTION

According to the present invention, a semi-trailer truck body of conventional design is equipped with side shelving vertically spaced along the inner wall surfaces, and with a lift assembly which may be readily installed within the rear access opening and power operated to shift a support fork assembly from a lowermost position to positions coincident with the spaced shelving levels to which the fork lifted articles, such as caskets, may be transferred in a predetermined selection for easy sorting and breaking of loads at intermediate unloading destinations. To this end, vertical trackways are provided at opposite sides of the truck body just within the access opening for receiving sliding shoes carrying inwardly directed arms projecting through and movable along openings in the trackways. The arms have rearwardly extending article support arms transversely spaced apart removably attached thereto and extending rearwardly of the access opening in the truck body.

With the above in mind, an object of the invention is to provide a lift assembly which may be readily attached within the rear access opening of a truck body for protection against dirt and the weather.

Another object of the invention is to provide a lift assembly on which the lift assembly provides unobstructed space for the operator to move freely along the truck bed for shifting articles between the lift assembly and any level of shelving within the truck body.

The invention still further aims to provide a lift assembly substantially of the above type which is relatively simple in construction and parts for ready attachment to a truck body; which lends itself to one man operation for loading and unloading, and to simple power actuation, as by winch or hydraulic lift, to various levels.

DESCRIPTION OF THE INVENTION

With reference to the accompanying drawings,

FIG. 1 is a side view of a pick-up truck and semi-trailer with the trailer shown in section to illustrate the included lift assembly, actuating means therefor and the interior shelving arrangement;

FIG. 2 is an enlarged section along the line 2—2 of FIG. 1;

Figure 3:
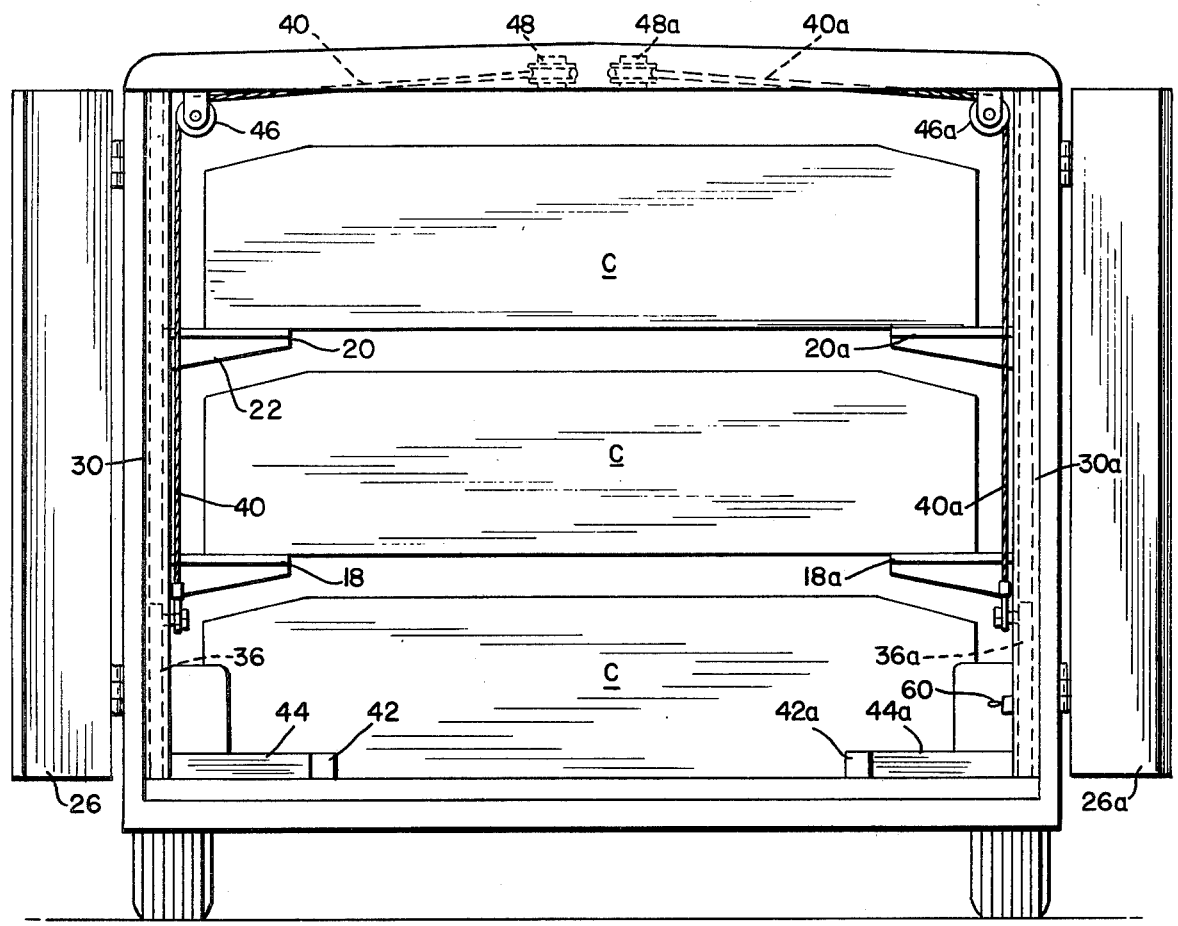
FIG. 3 is an enlarged rear view of the trailer shown in FIG. 1.

As illustrated in the drawings, and with particular reference to FIG. 1, the rear end of a pick-up truck 10 is shown attached to the forward overhang of a low load semi-trailer 12 by a conventional swivel connection 14. Above the floor bed 16 of the trailer, there are provided shelves along opposite sides of the trailer body in two levels 18, 18a, 20, 20a above the bed 16. These shelves are supported along the lengths thereof by an upper and lower series of brackets 22, 22a secured at vertical reinforcing channel columns 24, 24a, see FIG. 2 in which it is to be noted that there is central access space for an operator between the side shelves, and that there are provided conventional swinging doors 26, 26a for closing the access opening of the trailer body. Articles to be supported on the shelves and on the lift assembly, such as caskets, are designated by the numeral C.

Figure 4:
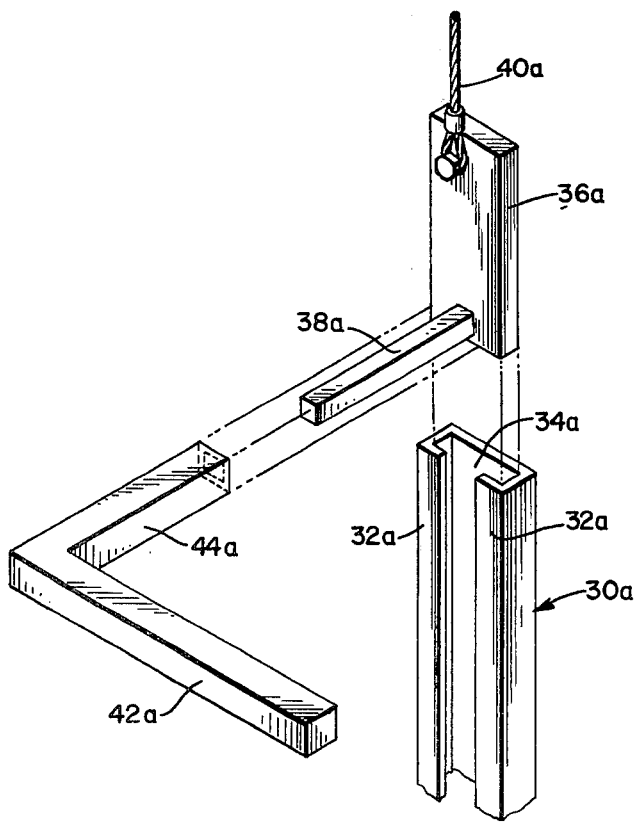
FIG. 4 is an exploded fragmentary perspective of the truck, shoe and support arms of the lift assembly.

There is a duplicate lift assembly at each side of the rear access opening of the trailer body and disposed slightly within the rear ends of the trailer sides for ease of installation and protection against the elements of the weather and dirt when the doors 26, 26a are closed. For illustration, the details of one side lift assembly are shown in FIG. 4 to which reference is now made. A vertically disposed hollow track 30a is in the form of a channel with the outer closed wall thereof suitably secured, as by welding or bolts or the like, to the adjacent rear corner post 28a of the trailer body. The inner wall of the track includes inturned flanges 32a providing a longitudinal slot 34a throughout substantially the length thereof. A sliding shoe 36a is snugly fitted on the track channel for vertical sliding movement therealong with an inwardly extending bar or arm 38a of square or other out-of-round configuration rigidly fixed thereto. A cable 40a is attached to the upper end of the shoe as by a bolt or the like. A support fork of L-shape includes a rearwardly extending base support arm 42a fixed to a laterally outwardly extending attachment arm portion 44a of hollow internal configuration complemental to the external shape configuration of the arm 38a and adapted to be removably telescoped therewith for various spacings and secured, if desired, by screw means or the like, thus to be moved with the shoe 36a in its guided sliding movement in the channel track 30a.

With reference particularly to FIGS. 2 and 3, the lift assemblies have been associated with the truck body as unit installations. Thus, the tracks 30, 30a have been assembled to the corner posts 28, 28a, respectively, with each track 30, 30a having the shoes 36, 36a, respectively, slidable therein and with the shoe-supported arms 38, 38a adapted for travel in the track slots 34, 34a, respectively. Each cable 40, 40a extends vertically from its corresponding shoe to a corresponding pulley 46, 46a, respectively, mounted adjacent the corresponding roof corners with the axis of each pulley being generally longitudinally of the trailer body to direct the corresponding cable reaches inwardly to a corresponding one of a pair of centrally disposed roof supported pulleys 48, 48a, respectively, each with its axis disposed vertically or slightly inclined thereto, thus to direct the corresponding cable reaches forwardly. The cables 40, 40a merge with a single cable 40b secured to a roof mounted overhead cylinder 50 with return trained over a hydraulic ram pulley 52. The hydraulic cylinder 50 is connected by fluid conduits 54 with a hydraulic power unit 56 mounted in the forward overhang of the trailer.

In operation, the pick-up and semi-trailer assembly are positioned at a loading deck or in position for receiving articles, as caskets, from a dolly or the like, at the rear end. With the fork arms 42, 42a at a low position, a container or casket C is placed thereon (FIG. 2) and the container or casket may be pushed by the attendant operator along the track bed 16 to the lower transport positions (FIG. 1); or the lift may be operated to elevate the shoes and attached forks to the level of shelves 18 or 20 and shifted therealong to the transport positions (FIG. 1). In loading or unloading, the attendant operator is free to maneuver on the truck bed between the forks and between the shelves as permitted by the containers supported thereon. During transport, the forks may be removed by sliding the telescoping arms 44, 44a inwardly away from the bars 38, 38a and stored on the bed and the doors 26, 26a closed to protect against weather and dirt. For unloading, the attendant operator may set the forks at the desired level and transfer thereto the nearest containers for lowering to the position of FIGS. 2 and 3 for unloading. The hydraulic power unit 56 is equipped with a directional solenoid valve for directional ram control and a conventional push button switch 60 with "up" and "down" positions for operator control. Wiring connections are provided between the switch and a conventional motor for the hydraulic unit and which may be powered from a suitable power pack battery which may be recharged from the truck generator system.

I claim:

1. In combination with a low-load semi-trailer truck body having a rear access opening with closing door means and side shelving at vertically spaced levels along each side of the truck body leaving attendant operating space between the side shelving along the lengths thereof; the provision of a lift assembly within the confines of the access opening to be protected against weather and dirt with the door means closed; said lift assembly including a channel-like track mounted within each side of the access opening and having inturned flanges defining a longitudinal opening therebetween; a sliding shoe within each track and trapped by said flanges for sliding movement along each channel; a support arm carried by each shoe and projecting inwardly through said longitudinal opening and movable with a respective shoe therealong with the inner end of each support arm spaced laterally from one other to leave attendant operating space therebetween; a load carrying fork element adapted for removable attachment to each support arm and including a first angle portion to be mounted to a corresponding support arm and a rearwardly extending angle portion for underlying support beneath a load and with the rearwardly extending angle portions spaced laterally from one other to leave attendant operating space therebetween; and means connected with each shoe and adapted for attachment to a source of power for actuating the shoes in their sliding movement along each track, whereby the load-carrying fork can be shifted between a lower position and upper positions selectively leveled with the rear ends of said side shelving permitting an attendant in the attendant operating space to shift the loads between the fork elements and the shelving during loading and unloading.

2. The combination of claim 1, wherein the first angle portion is provided with a longitudinal recess shaped to be removably telescoped with a shoe arm which is complementally shaped to prevent relative rotation therebetween.

3. The combination of claim 1, wherein the rear ends of the shelving terminates short of the said tracks leaving space therefor permitting closing of the door means upon removal of said fork elements for storage during transport.

4. A lift assembly adapted for attachment along the side walls of the access opening of a truck body, such as a low-load semi-trailer; and comprising a pair of tracks of channel formation with flanges directed toward one another defining a longitudinal opening; a pair of shoes, one to be assembled to the channel formation of each track and confined by said flanges for sliding movement, and each shoe including a lateral arm projecting through the longitudinal opening of its associated track; each said track and shoe assembly adapted for mounting in mirror image by mounting means to opposite side walls of the access opening; cable means attached to each shoe for direction to a suitable source of power; and a pair of angled support elements with a first angle portion of each pair adapted for removable attachment to a corresponding shoe arm and with another angle portion projecting rearwardly in laterally spaced relation to one another for receiving articles to be loaded and unloaded through the access opening while providing attendant operating space therebetween.

5. A lift assembly as claimed in claim 4, wherein the first angle portion of each support element and the corresponding shoe arm are relatively telescoped in assembled positions.

6. A lift assembly as claimed in claim 5, wherein the first angle portion of each support element is provided with a longitudinal recess shaped to telescopically receive a complementally shaped associated shoe arm to prevent relative rotation therebetween.

* * * * *